US012625011B2

(12) United States Patent
Zhou et al.

(10) Patent No.: US 12,625,011 B2
(45) Date of Patent: May 12, 2026

(54) TEMPERATURE DETECTION SYSTEM AND ON BOARD CHARGER

(71) Applicant: Delta Electronics (Shanghai) Co., Ltd., Shanghai (CN)

(72) Inventors: Zhen Zhou, Shanghai (CN); Peiai You, Shanghai (CN); Jianhong Chen, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 587 days.

(21) Appl. No.: 17/452,405

(22) Filed: Oct. 27, 2021

(65) Prior Publication Data

US 2022/0178763 A1 Jun. 9, 2022

(30) Foreign Application Priority Data

Dec. 8, 2020 (CN) .......................... 202011423927.8

(51) Int. Cl.
| | |
|---|---|
| *G01K 1/16* | (2006.01) |
| *B60L 3/00* | (2019.01) |
| *G01K 1/14* | (2021.01) |

(52) U.S. Cl.
CPC .............. *G01K 1/16* (2013.01); *B60L 3/0023* (2013.01); *G01K 1/14* (2013.01)

(58) Field of Classification Search
CPC . G01K 1/16; G01K 1/14; G01K 13/00; B60L 3/0023; B60L 53/20
See application file for complete search history.

(56) References Cited

U.S. PATENT DOCUMENTS

| | | | | |
|---|---|---|---|---|
| 5,695,285 A | * | 12/1997 | Kuberka | .................. G01K 1/16 |
| | | | | 374/208 |
| 2005/0019219 A1 | * | 1/2005 | Oshiman | ............ G01N 27/3273 |
| | | | | 422/68.1 |

(Continued)

FOREIGN PATENT DOCUMENTS

| | | |
|---|---|---|
| CN | 1222744 A | 7/1999 |
| CN | 202856374 U | 4/2013 |

(Continued)

OTHER PUBLICATIONS

"Thermal-contact." YourDictionary, n.d. Web. Jul. 1, 2017. <http://www.yourdictionary.com/thermal-contact>. (Year: 2017).*

(Continued)

Primary Examiner — John E Breene
Assistant Examiner — Janice M Soto
(74) Attorney, Agent, or Firm — CKC & Partners Co., LLC

(57) ABSTRACT

The present application provides a temperature detection system and an on board charger, the system including a heat transfer element and a temperature sensor; the heat transfer element and the temperature sensor are both located on a printed circuit board. The heat transfer element is thermally connected to the temperature sensor, and is also configured to thermally connect to the power device on the printed circuit board. The heat transfer element is configured to transfer a temperature of the power device to the temperature sensor, so that the temperature sensor detects the temperature of the power device. The heat transfer element is an electrically insulating element. The heat transfer element is thermally connected to the power device and temperature sensor.

20 Claims, 3 Drawing Sheets

(56) References Cited

U.S. PATENT DOCUMENTS

| | | | | |
|---|---|---|---|---|
| 2015/0291043 A1* | 10/2015 | Nam | ..................... | B60L 53/665 |
| | | | | 320/137 |
| 2018/0045577 A1* | 2/2018 | Sun | ......................... | G01K 1/18 |
| 2020/0124483 A1* | 4/2020 | Hosotani | ................. | G01K 1/16 |

FOREIGN PATENT DOCUMENTS

| | | | | | |
|---|---|---|---|---|---|
| CN | 203024883 U | | 6/2013 | | |
| CN | 107087357 A | | 8/2017 | | |
| CN | 109360814 A | * | 2/2019 | .......... | H01L 23/345 |
| CN | 209249455 U | | 8/2019 | | |
| CN | 110274707 A | | 9/2019 | | |
| CN | 210071161 U | | 2/2020 | | |
| CN | 210221318 U | | 3/2020 | | |
| CN | 111189558 A | * | 5/2020 | | |
| CN | 111614337 A | | 9/2020 | | |
| CN | 214251310 U | | 9/2021 | | |
| DE | 19728804 A1 | * | 2/1999 | .............. | G01K 1/16 |
| DE | 102010046992 A1 | * | 9/2011 | .............. | G01K 1/14 |

OTHER PUBLICATIONS

Corresponding Chinese office action issued on Jan. 6, 2025 with its English translation.
The office action of corresponding China application No. 202011423927.8 mailed on Jun. 26, 2024.

* cited by examiner

--Prior Art--

131

TEMPERATURE DETECTION SYSTEM AND ON BOARD CHARGER

CROSS-REFERENCE TO RELATED APPLICATIONS

This application claims priority to Chinese Patent Application No. 202011423927.8, filed on Dec. 8, 2020, which is hereby incorporated by reference in its entirety.

TECHNICAL FIELD

The present application relates to the technical field of on board chargers, and in particular, to a temperature detection system and an on board charger.

BACKGROUND

With the increasing endurance capability of electric vehicles, the power of an on board charger also increases, and the thermal management of products becomes more and more important. A power device is the core component of the on board charger, so it is particularly important to solve the thermal management problem of the power device. The stability of the power device is directly related to the reliability of the whole product. Therefore, when the product is running, it is necessary to monitor the temperature of the power device, and when its temperature is abnormal, the corresponding protection is triggered to ensure that the power device is not damaged due to an excessive temperature.

In the prior art, a temperature sensor is placed around a power device to detect a temperature of the power device. Due to a potential difference between the power device and the temperature sensor, it is required to separate a certain distance between a pad of the power device and a pad of the sensor.

However, heat transfer between the power device and the sensor is carried out through a printed circuit board, the printed circuit board has poor lateral capacity of heat-transmission, and there is a great heat transfer resistance between the power device and the sensor, which leads to the problem of slow response speed of temperature detection, and the product cannot trigger a protection in time, and the power device being damaged by over-temperature cannot be effectively prevented.

SUMMARY

The present application provides a temperature detection system and an on board charger to solve the problem of slow response speed of temperature detection.

In a first aspect, a temperature detection system, including: a heat transfer element and a temperature sensor;

the heat transfer element and the temperature sensor are both located on a printed circuit board;

the heat transfer element is thermally connected to the temperature sensor, and is also configured to thermally connect to a power device on the printed circuit board;

the heat transfer element is configured to transfer a temperature of the power device to the temperature sensor, so that the temperature sensor detects a temperature of the power device;

the heat transfer element is an electrically insulating element.

Optionally, the power device, the heat transfer element and the temperature sensor are all welded on the printed circuit board, a pad of the heat transfer element is thermally connected to a pad of the power device, and the pad of the heat transfer element is thermally connected to a pad of temperature sensor.

Optionally, the heat transfer element and the temperature sensor are an integrated package structure.

Optionally, the heat transfer element is a surface mounted integrated package structure.

Optionally, the temperature sensor is located on the heat transfer element.

Optionally, the temperature sensor is mounted on a cladding of the heat transfer element by means of welding.

Optionally, one temperature sensor is thermally connected to a plurality of heat transfer elements, and the plurality of heat transfer elements are thermally connected to one power device.

Optionally, a plurality of power devices are disposed on the printed circuit board, and the heat transfer element is thermally connected to a power device with the highest temperature.

Optionally, a material of the heat transfer element includes aluminum oxide and/or aluminum nitride.

Optionally, the temperature detection system is disposed on an on board charger.

In a second aspect, an on board charger, including: a power device, a printed circuit board, and the temperature detection system according to the first aspect and the alternative solutions;

where the temperature detection system and the power device are located on the printed circuit board.

The present application provides a temperature detection system and an on board charger, the system including a heat transfer element and a temperature sensor; the heat transfer element and the temperature sensor are both located on a printed circuit board. The heat transfer element is thermally connected to the temperature sensor, and is also configured to thermally connect to the power device on the printed circuit board; the heat transfer element is configured to transfer a temperature of the power device to the temperature sensor, so that the temperature sensor detects the temperature of the power device; the heat transfer element is an electrically insulating element. The heat transfer element is thermally connected to the power device and temperature sensor, which quickly transfers the temperature of the power device to the temperature sensor, effectively reduces a heat transfer resistance between the power device and the temperature sensor, improves a response speed of the temperature sensor to the temperature of the power device, and effectively prevents the power device from being damaged by over temperature.

BRIEF DESCRIPTION OF DRAWINGS

In order to explain the technical solutions of the present application or the prior art more clearly, drawings used in the description of embodiments or the prior art will be briefly introduced below. Obviously, the drawings in the following description are some embodiments of the present application, for those of ordinary skill in the prior art, other drawings can be obtained based on these drawings without creative labor.

DESCRIPTION OF REFERENCE NUMERALS

Figure 1:
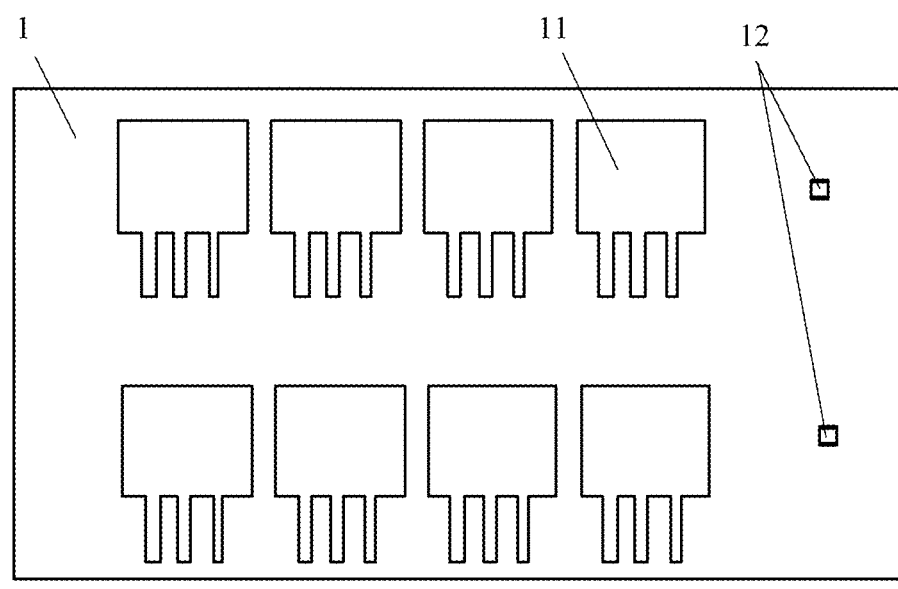
FIG. 1 is a schematic diagram of a temperature detection system provided in the prior art.

1 printed circuit board
11 power device
12 temperature sensor
13 heat transfer element
14 integrated package structure
131 cladding Through the above-mentioned drawings, specific embodiments of the present application have been shown, which will be described in more detail later. These drawings and written descriptions are not intended to limit the scope of the concept of the present application in any way, but to explain the concept of the present application to those skilled in the art by referring to specific embodiments.

DETAILED DESCRIPTION OF EMBODIMENTS

In order to make the purpose, technical solutions, and advantages of embodiments of the present application more clearly, the technical solutions in the embodiments of the present application will be described clearly and completely in conjunction with the drawings in the embodiments of the present application. Obviously, the described embodiments are part of the embodiments of the present application, rather than all of the embodiments.

First of all, those skilled in the art should understand that these embodiments are only used to explain the technical principle of the present application, and are not intended to limit the protection scope of the present application. Those skilled in the art can adjust it as needed to suit specific application scenarios.

Secondly, it should be noted that in the description of the present application, the terms of the direction or position relationship indicated by the terms "upper" and "lower", etc., are based on the direction or position relationship shown in the drawings, which is only for convenience of description, but does not indicate or imply that the apparatus or component must have a specific orientation, being constructed and operated in a specific orientation, so it cannot be understood as a limitation of the present application.

In addition, it should be noted that in the description of the present application, unless otherwise specified and limited, the terms "contact" and "connection" should be understood in a broad sense, for example, they can be fixed connection, detachable connection or integrated connection either; it can be mechanical connection or electrical connection. It can be direct connection, indirect connection through an intermediate medium, or communication inside two components. For those skilled in the art, the specific meanings of the above terms in the present application can be understood according to specific situations.

In the description of this specification, descriptions referring to the terms "one embodiment", "some embodiments", "schematic embodiments", "examples", "specific examples", or "some examples", etc., mean that specific features, structures, materials or characteristics described in connection with this embodiments or examples are included in at least one embodiments or examples of the present disclosure. In this specification, the schematic expressions of the above terms do not necessarily refer to the same embodiments or examples. Furthermore, the specific features, structures, materials or characteristics described may be combined in any one or more embodiments or examples in a suitable manner.

The on board charger refers to the charger on the electric vehicle, which has the capability of safely and automatically charging the full power battery of the electric vehicle. The charger can dynamically adjust the charging current or voltage parameters according to the data provided by the battery management system (BMS), and execute corresponding actions, and complete the charging process. The output power of the on board charger can reach tens of kilowatts to hundreds of kilowatts. Essentially, the on board charger is a switching power supply. The on board charger needs to obtain AC power from the charging pile, and convert it into high-voltage DC power, and then transmit it to BMS. The on board charger is placed between the charging pile and BMS. The on board charger communicates with BMS through the controller area network (CAN) bus, receives the battery charging status and charging requirements, etc., sent by the BMS, and sends the real-time charging loop status information to the BMS.

A power device of the on board charger works in an on-off state with a switching frequency of about 100 K. During the whole working process, the heat loss is very serious. Taking the output power of 7.2 kW as an example, 5% loss will still occur at 95% efficiency under full load operation, that is, 360 W power consumption, of which about 75% loss (that is, 270 W) is generated by the power device. Therefore, the power device is the main heat source of the on board charger. Excessively high temperature rise of the power device will reduce the power conversion efficiency of the whole charger, and it will also reduce the life expectancy of the charger and even lead to explosion and safety accidents. The stability of the whole product is directly related to the reliability of the power device. Therefore, when the product is running, it is necessary to monitor the temperature of the power device, and when its temperature is abnormal, the corresponding protection is triggered to ensure that the power device is not damaged due to excessive temperature.

FIG. 1 is a schematic diagram of a temperature detection system provided in the prior art. As shown in FIG. 1, a power device 11 and a temperature sensor 12 are welded on a printed circuit board 1. Due to a potential difference between the power device 11 and the temperature sensor 12, it is required to separate a certain distance between a pad of the power device 11 and a pad of the sensor 12. Heat is transferred between the power device 11 and the temperature sensor 12 through a copper foil on the printed circuit board 1. However, thermal coefficient of the printed circuit board 1 is about 0.3 W/mK, and lateral capacity of heat-transmission is poor, and the heat transfer resistance between the power device 11 and the temperature sensor 12 is large. As a result, a response speed of temperature sensor 12 to the temperature of power device 11 is too slow, and the product can't trigger protection in time, which can't effectively prevent the power device from being damaged by over-temperature.

To solve the above problems, an embodiment of the present application provides a temperature detection system, which utilizes a heat transfer element to transfer a temperature of the power device to the temperature sensor by using the characteristics for heat-transmission and electrically insulation of the heat transfer element, the heat transfer resistance between the power device and the temperature sensor is effectively reduced, the response speed of the temperature sensor to the temperature of the power device is improved, and over-temperature damage of power device is effectively prevented.

The following describes several realizable temperature detection systems, so that those skilled in the art can understand the technical solutions and advantages of the present application more clearly.

Figure 2:
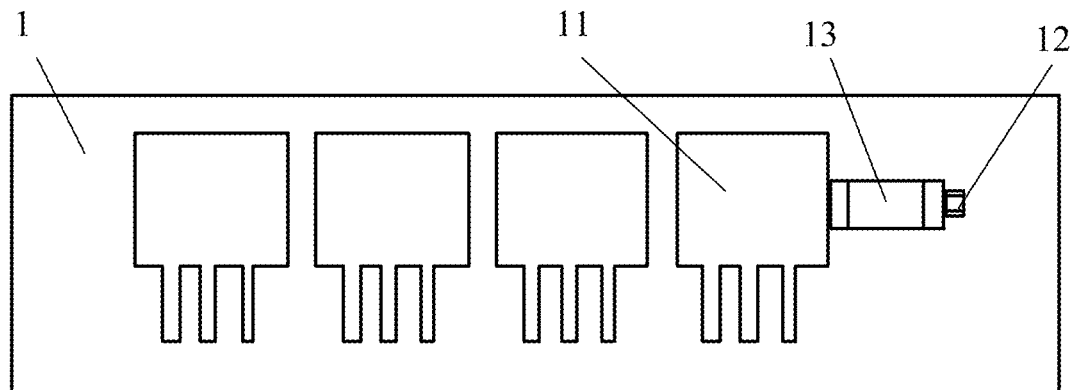
FIG. 2 is a schematic diagram of a temperature detection system provided according to an exemplary embodiment of the present application.

FIG. 2 is a schematic diagram of a temperature detection system provided according to an exemplary embodiment of the present application. As shown in FIG. 2, the temperature detection system provided in this embodiment includes: a heat transfer element 13 and a temperature sensor 12; the heat transfer element 13 and the temperature sensor 12 are both located on a printed circuit board 1; the heat transfer element 13 is thermally connected to the temperature sensor 12, and the heat transfer element 13 is also configured to thermally connect to the power device 11 on the printed circuit board 1. The heat transfer element 13 is configured to transfer the temperature of the power device 11 to the temperature sensor 12, so that the temperature sensor 12 detects the temperature of the power device 11. The heat transfer element 13 is an electrically insulating element.

On the printed circuit board 1 of the on board charger, one end of the power device 11 is thermally connected to one end of the heat transfer element 13, and the other end of the heat transfer element 13 is thermally connected to one end of the temperature sensor 12. In actual application, a distance between the power device 11 and the temperature sensor 12 can be determined according to a potential difference between the power device 11 and the temperature sensor 12. The heat transfer element 13 is located between power device 11 and temperature sensor 12, so that the heat transfer element 13 can quickly transfer the temperature of the power device 11 to the temperature sensor 12. The heat transfer element 13 is the electrically insulating element, which has characteristic for heat-transmission.

In the practical application process, the power device will produce a loss in the working process, which will be emitted in the form of heat, and thus temperature rise of the power device could be caused. After the heat transfer element receives the temperature of the power device, the heat transfer element quickly transfers the temperature of the power device to one end of the temperature sensor. The temperature sensor receives the temperature of power device and judges whether the temperature of power device exceeds a normal working temperature. If the temperature of the power device exceeds the normal working temperature, the corresponding protection is triggered to ensure that the power device is not damaged due to overheating.

The temperature detection system provided in this embodiment includes a heat transfer element and a temperature sensor. The heat transfer element and the temperature sensor are both located on a printed circuit board, and a power device is also located on the printed circuit board. The heat transfer element is thermally connected to the temperature sensor and the power device. The heat transfer element transfers a temperature of the power device to the temperature sensor, and the temperature sensor is configured to detect the temperature of the power device. The heat transfer element has characteristics for heat-transmission and electrically insulation. There is a potential difference between the power device and the temperature sensor, so that they cannot be directly connected. In this system, the heat transfer element is placed between the power device and the temperature sensor by using the characteristics for heat-transmission and electrically insulation of the heat transfer element, so that the temperature of the power device is quickly transmitted to the temperature sensor, the heat transfer resistance between the power device and the temperature sensor is effectively reduced, and the response speed of the temperature sensor to the temperature of the power device is improved.

Figure 3:
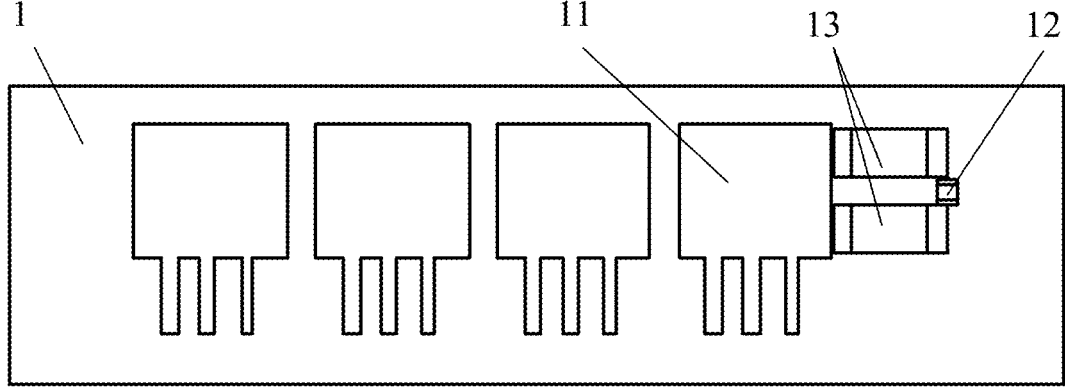
FIG. 3 is a schematic diagram of a temperature detection system provided according to another exemplary embodiment of the present application.

FIG. 3 is a schematic diagram of a temperature detection system provided according to another exemplary embodiment of the present application. As shown in FIG. 3, in the temperature detection system provided in this embodiment, one temperature sensor 12 is thermally connected to a plurality of heat transfer elements 13, and the plurality of heat transfer elements 13 are thermally connected to one power device 11.

As shown in FIG. 3, two heat transfer elements 13 are disposed on a right side of the power device 11, and the temperature sensor 12 is interposed between the two heat transfer elements 13 and thermally connected to the two heat transfer elements, which further improves detection speed of the temperature sensor.

In actual application, it is decided how many heat transfer elements 13 are thermally connected to one power device 11 according to specific requirements. The more the number of heat transfer elements 13 is, the faster the heat conduction speed is, and response speed of the temperature sensor 12 to the temperature will also increase.

Optionally, the power device 11, the heat transfer element 13 and the temperature sensor 12 are all welded on a printed circuit board 1, a pad of the heat transfer element 13 is thermally connected to a pad of the power device 11, and the other pad of the heat transfer element 13 is thermally connected to a pad of the temperature sensor 12.

On the printed circuit board 1, the pad positions of the power device 11, the temperature sensor 12 and the heat transfer element 13 are provided. In actual application, the pad positions of the power device 11 and the temperature sensor 12 can be reasonably provided according to the potential difference between the power device 11 and the temperature sensor 12. The pad of one end of the power device 11 is thermally connected to the pad of one end of the heat transfer element 13, and the pad of the other end of the heat transfer element 13 is thermally connected to the pad of one end of the temperature sensor device 12.

Optionally, a plurality of power devices are disposed on the printed circuit board, and the heat transfer element 13 is thermally connected to a power device with the highest temperature.

Specifically, before the welding is performed of the heat transfer element and the temperature sensor with the printed circuit board, the simulation test is performed on a plurality of power devices on the printed circuit board, and the power device with the highest temperature among the plurality of power devices is determined. As shown in FIG. 3, the power device in the figure is the power device with the highest temperature determined by simulation test. A pad of the power device with the highest temperature is thermally connected to the pad of the heat transfer element, and the temperature sensor detects a temperature of the power device with the highest temperature. If the power device with the highest temperature does not exceed the normal working temperature, it is considered that the temperatures of other power devices are also within the normal working temperature. The heat transfer element is thermally connected to the power device with the highest temperature, which makes the layout of the power device, the heat transfer element and the temperature sensor on the printed circuit board simpler and more effective.

Optionally, the material of the heat transfer element includes aluminum oxide and/or aluminum nitride.

Specifically, the material of the heat transfer element includes, but is not limited to, aluminum oxide and/or aluminum nitride, which may be aluminum oxide or aluminum nitride, or a mixture of aluminum oxide and aluminum nitride. The material of the heat transfer element has the characteristics for heat-transmission and electrically insulation, and the manufacturing material of the heat transfer element is not specifically limited herein.

For example, aluminum oxide has the characteristics for heat-transmission and electrically insulation, and its price is lower, its source is wider, and its filling amount is larger. The heat transfer element made of aluminum oxide as materials has a thermal coefficient of about 29.3 W/mK, and its lateral capacity of heat-transmission is about 97.7 times that of the printed circuit board. The heat transfer resistance between the power device and the temperature sensor is effectively reduced, so that the temperature sensor's temperature following ability to the power device is enhanced, and the power device can be effectively protected when the on board charger works.

Optionally, the temperature detection system is disposed on an on board charger.

Specifically, the temperature detection system is configured to detect the temperature of the power device of the on board charger, so that when the temperature of the power device of the on board charger is too high, the on board charger triggers the protection in time to prevent the power device from being damaged by over-temperature.

In the temperature detection system provided in this embodiment, a plurality of heat transfer element are disposed to transfer the temperature of the power device, thereby the response speed of the temperature sensor is further improved. The pad positions of the power device, the heat transfer element and the temperature sensor are disposed reasonably on the printed circuit board. Before mass production, the power device with the highest temperature in the working process is determined by simulation analogy test, and the temperature of the power device with the highest temperature is detected, which makes the layout of power devices, heat transfer elements and temperature sensors on the printed circuit board simpler and more effective, and effectively prevents the power device from being damaged by over-temperature.

Figure 4:
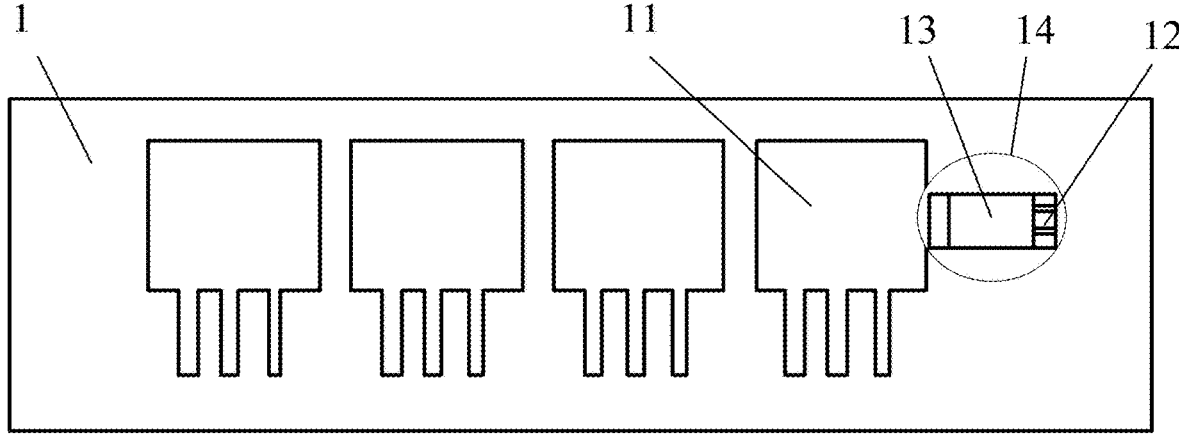
FIG. 4 is a schematic diagram of a temperature detection system provided according to further another exemplary embodiment of the present application.

FIG. 4 is a schematic diagram of a temperature detection system provided according to further another exemplary embodiment of the present application. As shown in FIG. 4, in the temperature detection system provided in this embodiment, a heat transfer element 13 and a temperature sensor 12 are an integrated package structure 14.

Specifically, the heat transfer element 13 can be perforated, and the temperature sensor 12 can be put into a hole to integrate the package structure 14. The temperature sensor 12 can also be placed on the heat transfer element 13 and integrate the package structure 14. There is no specific limitation on how to integrate the heat transfer element 13 with the temperature sensor 12. The integrated package structure 14 is an integral part, and it can be directly welded on a printed circuit board 1 when in use.

Optionally, the heat transfer element 13 in all the above embodiments can be a surface mounted integrated package structure.

Specifically, the heat transfer element 13 is packaged according to the existing surface mounted devices (SMD) size. SMD is one of surface mount technology (SMT) components, which has the advantage of small size and is suitable for a printed circuit board with dense lines.

In the temperature detection system provided in this embodiment, the heat transfer element and the temperature sensor are integrated to obtain the integrated package structure, and only the integrated package structure needs to be welded when in use, which further simplifies the layout of all devices on the printed circuit board.

Figure 5:
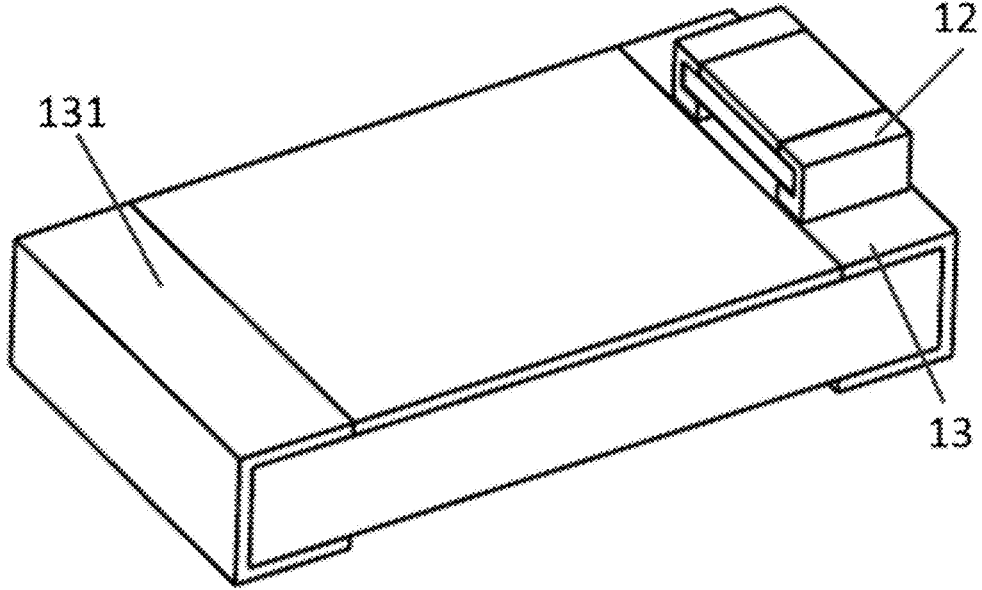
FIG. 5 is a schematic diagram of a temperature detection system provided according to another exemplary embodiment of the present application.

FIG. 5 is a schematic diagram of a temperature detection system provided according to another exemplary embodiment of the present application. As shown in FIG. 5, in the temperature detection system provided in this embodiment, a temperature sensor 12 is located on a heat transfer element 13.

Specifically, the temperature sensor is a surface mounted structure and the heat transfer element 13 is a surface mounted structure, and the temperature sensor 12 is placed on the heat transfer element 13 to form a surface mounted integrated package structure.

Optionally, the temperature sensor 12 is mounted on a cladding 131 of the heat transfer element 13 by means of welding.

Specifically, both ends of the heat transfer element 13 are provided with the cladding 131, which has the advantages of improving the surface hardness of the heat transfer element, improving friction, reducing wear, improving conductivity, reducing contact resistance, enhancing magnetism, preventing diffusion and penetration, or repairing worn parts, etc. The temperature sensor 12 is placed on the cladding, and the temperature sensor 12 is mounted on the cladding 131 of the heat transfer element 13 by means of welding to form the surface mounted integrated package structure.

Figure 6:
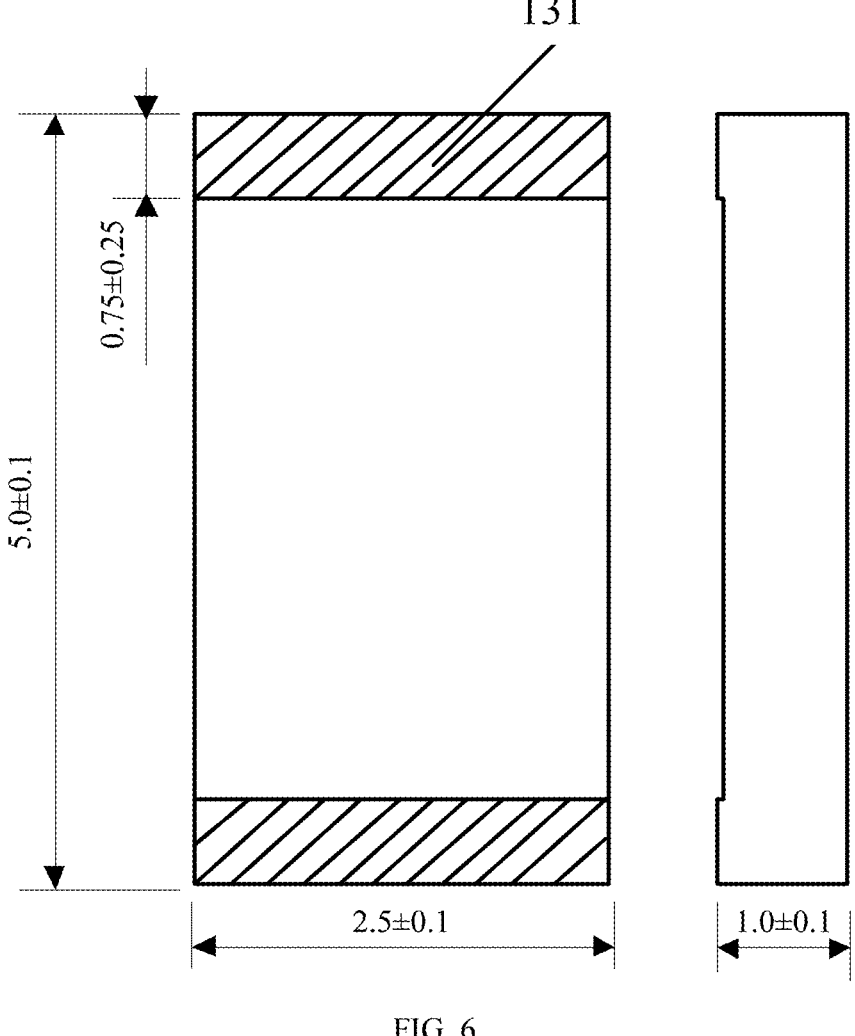
FIG. 6 is a dimensional schematic diagram of a heat transfer element in a temperature detection system provided according to another exemplary embodiment of the present application.

FIG. 6 is a size diagram of a heat transfer element in a temperature detection system provided according to another exemplary embodiment of the present application. As shown in FIG. 6, a heat transfer element 13 has a length of 5.0±0.1 mm, a width of 2.5±0.1 mm and a height of 1.0±0.1 mm. The length and width of a cladding 131 are 2.5±0.1 mm and 0.75±0.25 mm respectively.

In the temperature detection system provided in this embodiment, the heat transfer element and a temperature sensor are both in a surface mounted structure, a surface mounted integrated package structure is obtained by integrating them, and only the integrated package structure needs to be welded when in use, which further simplifies the layout of all devices on the printed circuit board.

Figure 7:
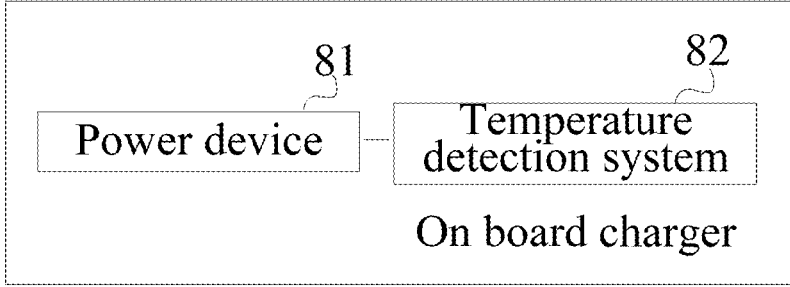
FIG. 7 is a schematic diagram of a hardware structure of an on board charger shown according to an exemplary embodiment of the present application.

FIG. 7 is a schematic diagram of the hardware structure of an on board charger shown according to an exemplary embodiment of the present application. As shown in FIG. 7, the embodiment of the present application provides the on board charger, including: a power device, a printed circuit board, and the temperature detection system mentioned in all the above embodiments.

Among them, the temperature detection system and the power device are located on the printed circuit board.

The on board charger refers to an apparatus which is set on the electric vehicle, converts the electric energy of the public power grid to the direct current required by the on board energy storage device, and charges the on board energy storage device.

The on board charger consists of AC input interface, power unit, control unit and DC output interface, etc. The on board charger has the function of high-speed CAN and BMS communication to judge whether the battery connection state is correct, and obtain battery system parameters, and real-time data of whole group and single battery before and during charging. The on board charger CAN communicate with the vehicle monitoring system through high-speed CAN, and upload the working state, working parameters and fault alarm information of the charger, and accept the control command of starting or stopping charging. The on board charger has complete safety protection measures, for example, in the charging process, the charger can ensure that the temperature, charging voltage and current of the power battery do not exceed the allowable values, and has the function of limiting the voltage of the single battery, automatically and dynamically adjusting the charging current according to the battery information of BMS.

It should be understood that in some embodiments, the above-mentioned thermal connections may not be direct connections, and the power device 11, the heat transfer element 13 and the temperature sensor 12 are all welded on the printed circuit board through the pad. The pad of the heat transfer element 13 and the pad of the power device 11 are thermally connected or directly connected by the copper foil of the printed circuit board, and the pad of the heat transfer element 13 and the pad of the temperature sensor 12 are thermally connected or directly connected by the copper foil of the printed circuit board.

Finally, it should be noted that the above embodiments are only used to illustrate the technical solutions of the present application, but not to limit it; although the application has been described in detail with reference to the aforementioned embodiments, those of ordinary skill in the art should understand that the technical solutions recorded in the aforementioned embodiments can still be modified, or some or all of the technical features can be equivalently replaced; however, these modifications or substitutions do not make the essence of the corresponding technical solutions deviate from the scope of the technical solutions of all embodiments of the present application.

What is claimed is:

1. A temperature detection system, comprising: a heat transfer element and a temperature sensor;
the heat transfer element and the temperature sensor are both located on a printed circuit board;
the heat transfer element is thermally connected to the temperature sensor, and also configured to thermally connect to a power device on the printed circuit board;
the heat transfer element is configured to transfer a temperature of the power device to the temperature sensor, so that the temperature sensor detects a temperature of the power device;
the heat transfer element is an electrically insulating element;
wherein the temperature sensor is located between a plurality of heat transfer elements and is directly physically connected to a plurality of heat transfer elements to improve detection speed of the temperature sensor, the plurality of heat transfer elements are directly physically connected to the power device.

2. The temperature detection system according to claim 1, wherein the power device, the heat transfer element and the temperature sensor are all welded on the printed circuit board, a pad of the heat transfer element is thermally connected to a pad of the power device, another pad of the heat transfer element is thermally connected to a pad of the temperature sensor.

3. The temperature detection system according to claim 1, wherein the heat transfer element and the temperature sensor are an integrated package structure.

4. The temperature detection system according to claim 1, wherein the heat transfer element is a surface mounted integrated package structure.

5. The temperature detection system according to claim 3, wherein the temperature sensor is located on the heat transfer element.

6. The temperature detection system according to claim 5, wherein the temperature sensor is mounted on a cladding of the heat transfer element by means of welding.

7. The temperature detection system according to claim 1, wherein a plurality of power devices are disposed on the printed circuit board, and the heat transfer element is thermally connected to a power device with the highest temperature.

8. The temperature detection system according to claim 1, wherein a material of the heat transfer element comprises aluminum oxide and/or aluminum nitride.

9. The temperature detection system according to claim 1, wherein the temperature detection system is disposed on an on board charger.

10. An on board charger, comprising: a power device, a printed circuit board and a temperature detection system; wherein the temperature detection system comprises a heat transfer element and a temperature sensor;
the heat transfer element and the temperature sensor are both located on a printed circuit board;
the heat transfer element is thermally connected to the temperature sensor, and also configured to thermally connect to a power device on the printed circuit board;
the heat transfer element is configured to transfer a temperature of the power device to the temperature sensor, so that the temperature sensor detects a temperature of the power device;
the heat transfer element is an electrically insulating element;
the temperature detection system and the power device are located on the printed circuit board;
wherein the temperature sensor is located between a plurality of heat transfer elements and is directly physically connected to a plurality of heat transfer elements to improve detection speed of the temperature sensor, the plurality of heat transfer elements are directly physically connected to the power device.

11. The on board charger according to claim 10, wherein the power device, the heat transfer element and the temperature sensor are all welded on the printed circuit board, a pad of the heat transfer element is thermally connected to a pad of the power device, another pad of the heat transfer element is thermally connected to a pad of the temperature sensor.

12. The on board charger according to claim 10, wherein the heat transfer element and the temperature sensor are an integrated package structure.

13. The on board charger according to claim 10, wherein the heat transfer element is a surface mounted integrated package structure.

14. The on board charger according to claim 12, wherein the temperature sensor is located on the heat transfer element.

15. The on board charger according to claim 14, wherein the temperature sensor is mounted on a cladding of the heat transfer element by means of welding.

16. The on board charger according to claim 10, wherein a plurality of power devices are disposed on the printed circuit board, and the heat transfer element is thermally connected to a power device with the highest temperature.

17. The on board charger according to claim 10, wherein a material of the heat transfer element comprises aluminum oxide and/or aluminum nitride.

18. The on board charger according to claim 10, wherein the temperature detection system is disposed on an on board charger.

19. The temperature detection system according to claim 1, wherein, the heat transfer element is perforated, and the temperature sensor is put into a hole to integrate a package structure.

20. The temperature detection system according to claim 1, wherein, the heat transfer element has a length of $5.0\pm0.1$ mm, a width of $2.5\pm0.1$ mm and a height of $1.0\pm0.1$ mm; a length and width of a cladding are $2.5\pm0.1$ mm and $0.75=0.25$ mm respectively.

* * * * *